United States Patent
Wee et al.

(10) Patent No.: US 11,509,912 B2
(45) Date of Patent: Nov. 22, 2022

(54) METHOD AND SYSTEM FOR ADAPTIVE IMAGE TRANSFERRING FOR ENHANCING IMAGE QUALITY

(71) Applicant: Fingram Co., Ltd, Yongin-si (KR)

(72) Inventors: Young Cheul Wee, Suwon-si (KR); Moo jae Lee, Suwon-si (KR)

(73) Assignee: Fingram Co., Ltd, Yongin-si (KR)

(*) Notice: Subject to any disclaimer, the term of this patent is extended or adjusted under 35 U.S.C. 154(b) by 0 days.

(21) Appl. No.: 16/993,206

(22) Filed: Aug. 13, 2020

(65) Prior Publication Data
US 2022/0038715 A1 Feb. 3, 2022

(30) Foreign Application Priority Data
Jul. 29, 2020 (KR) ......... 10-2020-0094579

(51) Int. Cl.
*H04N 19/164* (2014.01)
*H04L 43/0852* (2022.01)
*H04N 19/154* (2014.01)

(52) U.S. Cl.
CPC ....... *H04N 19/164* (2014.11); *H04L 43/0852* (2013.01); *H04N 19/154* (2014.11)

(58) Field of Classification Search
CPC ........................................ H04N 9/13
USPC ................................... 375/240.26
See application file for complete search history.

(56) References Cited

U.S. PATENT DOCUMENTS

| | | | |
|---|---|---|---|
| 2003/0161542 A1* | 8/2003 | Ridge | G06T 3/40 382/246 |
| 2012/0201476 A1* | 8/2012 | Carmel | H04N 19/60 382/239 |
| 2018/0146121 A1* | 5/2018 | Hensler | H04N 1/646 |
| 2020/0296331 A1* | 9/2020 | Jung | H04N 7/15 |

FOREIGN PATENT DOCUMENTS

KR 10-0954303 4/2010

* cited by examiner

*Primary Examiner* — Yulin Sun
(74) *Attorney, Agent, or Firm* — H.C. Park & Associates, PLC (57) ABSTRACT

An adaptive image transmission method for improving image quality, and a system thereof. The adaptive image transmission method for improving image quality includes the steps of: generating a reduced image by reducing an image for measuring a quality of an original image to be transmitted, by an image transmission system; measuring a restored image quality of the reduced image restored by decoding after performing pre-encoding on the reduced image, by the image transmission system; selectively resizing the original image based on the restored image quality, by the image transmission system; and encoding the selectively resized original image and transmitting the encoded image to an image reception system, by the image transmission system.

11 Claims, 5 Drawing Sheets

METHOD AND SYSTEM FOR ADAPTIVE IMAGE TRANSFERRING FOR ENHANCING IMAGE QUALITY

CROSS REFERENCE TO RELATED APPLICATION

This application claims priority from and the benefit of Korean Patent Application No. 10-2020-0094579, filed on Jul. 29, 2020, which is hereby incorporated by reference for all purposes as if fully set forth herein.

BACKGROUND

Field

Exemplary implementations of the invention relate generally to method and a system thereof, and more specifically, to a method and system for adaptively adjusting the resolution (size) of an image and transmitting the image on the basis of an image quality actually measured in a low frequency band network.

Discussion of the Background

The present invention has been developed under the support of the technology development project (S2744548) of the Ministry of SMEs and Startups, and the technology development project (D191986) of Gyeonggi-do.

As the demand for video streaming or the like through a network such as the Internet is increased, researches on image transmission techniques for guaranteeing high image quality at the client side are under progress.

Generally, when a transmission environment for sufficient bandwidth and bit rate is guaranteed, the client may receive the high quality image service by encoding and transmitting an original moving image without reducing the original resolution thereof, and decoding and playing the moving image at the side of receiving the image.

However, in a relatively poor network environment such as a low bandwidth environment or the like, the client may receive the higher quality image service when the original image is resized to reduce the original resolution thereof and transmitted at the transmitting side, and then the reduced image is enlarged and is played back at the receiving side, compared with transmitting an image by performing encoding while maintaining the original resolution of the image.

The example like this has also been disclosed in Korean Patent Registration No. 10-0954303 "Spatial resolution control system for video applications and transmission control method for video applications using the spatial resolution control system".

Like this, the transmitting side may transmit the reduced image to guarantee the high quality image service at the receiving side, i.e., a client, in an environment where the bandwidth is relatively insufficient. Thus, in order to determine whether or not to reduce the image, various prediction models of transmission bandwidth, image resolution, distortion amount, energy consumption, and the like may be considered.

However, even in the case of using such a conventional method, there is a problem in that a transmission result of an image may vary greatly even in the same environment according to image type, i.e., complexities different from each other, or whether a motion is big or small.

For example, when an image is simple or motions are very small, the receiving side may obtain a sufficiently high image quality even in a relatively low bandwidth. In this case, when the resolution of the image is reduced, the image quality may rather be degraded. On the contrary, when an image is complex or has a lot of motions and the image is transmitted with the original resolution as is even in the same network environment, the image quality obtained at the receiving side may be significantly degraded. Therefore, in this case, when an image of a reduced resolution is transmitted, an image of higher quality may be obtained.

As a result, when only a network environment is considered in transmitting an image without considering the quality of a streamed image as shown in the conventional method, it is difficult to maintain a high level image quality service.

To solve this problem, it may be considered to confirm the quality of a streaming image that directly affects the image quality service by performing encoding and decoding in advance before transmitting the image to be streamed, and determine whether to transmit the image to be streamed while maintaining the resolution or to reduce the original image and transmit a reduced image.

However, in this case, there is a problem in that it is difficult to execute a process for confirming the quality of an image to be streamed since there is high encoding and decoding time for the original image and a severe degradation of resources.

The related art is described below. Korean Patent Registration No. 10-0954303 "Spatial resolution control system for video applications and transmission control method for video applications using the spatial resolution control system"

The above information disclosed in this Background section is only for understanding of the background of the inventive concepts, and, therefore, it may contain information that does not constitute prior art.

SUMMARY

The present invention has been made in view of the above problems, and it is an object of the present invention to provide an adaptive image transmission method and a system thereof, which can maintain a service quality by effectively measuring an image quality level and adaptively transmitting an image on the basis of the measurement.

According to exemplary embodiments, there is an effect of maintaining a service quality by measuring the image quality level of an image to be streamed and adaptively transmitting the image based on the image quality level, and reducing the processing time and resources by confirming the image quality level of the image to be streamed through a reduced image of an original image.

In addition, as a reduced image of the original image considering the network delay factor is used, there is an effect of improving a service quality related to an image quality without significant degradation in service speed.

Additional features of the inventive concepts will be set forth in the description which follows, and in part will be apparent from the description, or may be learned by practice of the inventive concepts.

According to an exemplary embodiment, an adaptive image transmission method for improving image quality includes the steps of: generating a reduced image by reducing an image for measuring a quality of an original image to be transmitted, by an image transmission system; measuring a restored image quality of the reduced image restored by decoding after performing pre-encoding on the reduced image, by the image transmission system; selectively resizing the original image based on the restored image quality, by the image transmission system; and encoding the selectively resized original image and transmitting the encoded image to an image reception system, by the image transmission system.

The adaptive image transmission method for improving image quality may further include the steps of: confirming a network delay factor, by the image transmission system; and determining a reduction level of the reduced image based on the confirmed network delay factor.

The step of confirming a network delay factor by the image transmission system may include the step of: confirming a predicted network delay time as the network delay factor based on feedback information received from the image reception system, by the image transmission system; or confirming a state of a transmission buffer of the image transmission system as the network delay factor.

The step of determining a reduction level of the reduced image based on the confirmed network delay factor may include the step of classifying a degree of the network delay factor according to a predetermined criterion, and determining, when the degree of the network delay factor is classified as high, the reduction level to be low compared with when the degree of the network delay factor is classified as low, by the image transmission system.

The step of selectively resizing the original image based on the restored image quality may include the step of classifying a degree of the image quality according to a predetermined criterion, and resizing, when the image quality is classified as low, to reduce the original image much more compared with when the image quality is classified as high, by the image transmission system.

A non-transitory computer-readable medium having stored thereon computer-executable instructions configured to cause a processor to perform operations for performing the adaptive image transmission method.

According to another exemplary embodiment, an image transmission system includes: a processor; and a non-transitory computer-readable medium having stored thereon computer-executable instruction configured to cause the processor to perform operations, wherein the processor is configured to: generate a reduced image by reducing an image to measure a quality of an original image to be transmitted, measure a restored image quality of the reduced image restored by performing decoding after performing pre-encoding on the reduced image, determine an output resolution of the original image based on the measured image quality, selectively resize the original image based on the determined output resolution, and encode the resized original image and transmitting the encoded image to an image reception system.

The processor may be configured to confirm a network delay factor and determine a reduction level of the reduced image based on the confirmed network delay factor.

According to the technical level of the present invention, there is an effect of maintaining a service quality by measuring the image quality level of an image to be streamed and adaptively transmitting the image on the basis of the image quality level, and reducing the processing time and resources by confirming the image quality level of the image to be streamed through a reduced image of an original image.

In addition, as a reduced image of the original image considering the network delay factor is used, there is an effect of improving a service quality related to an image quality without significant degradation in service speed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Brief description of each drawing is provided in order to more sufficiently understand the drawings cited in the detailed description of the present invention.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In order to fully understand the present invention, the operational advantages of the present invention, and the objects achieved by the embodiments of the present invention, reference should be made to the accompanying drawings illustrating the preferred embodiments of the present invention and the contents described in the accompanying drawings.

In addition, in this specification, when any one component 'transmits' data to another component, it means that the component may directly transmit the data to another component, or may transmit the data to another component through at least one of other components. Contrarily, when any one component 'directly transmits' data to another component, it means that the data is transmitted from the component to another component without passing through yet another component.

Hereinafter, the present invention will be described in detail by describing a preferred embodiment of the present invention with reference to the accompanying drawings. Like reference numerals presented in each drawing indicate like members.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
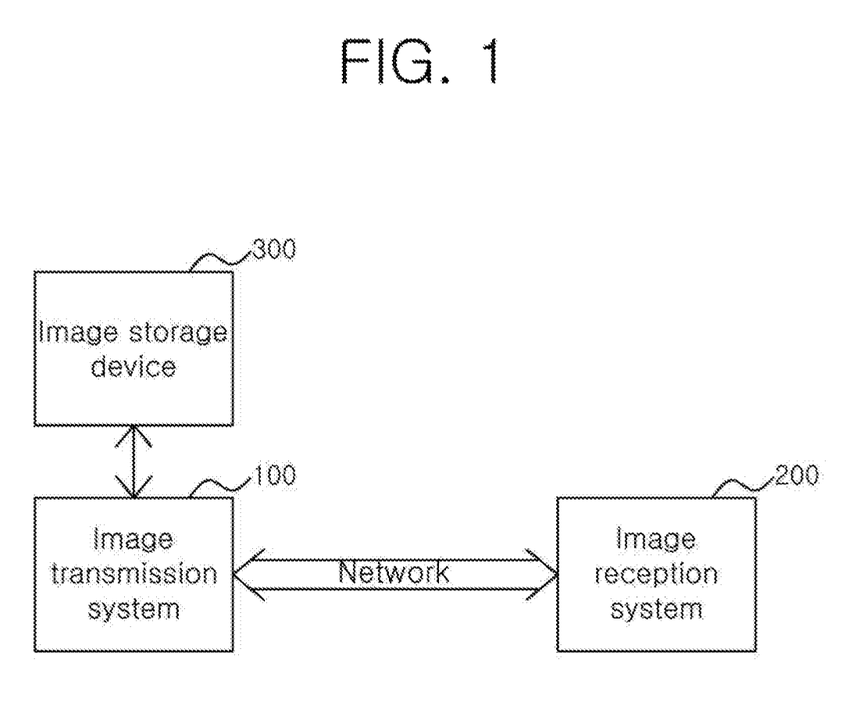
FIG. 1 illustrates a schematic system configuration for implementing an adaptive image transmission method for improving image quality according to an exemplary embodiment.

FIG. 1 illustrates a schematic system configuration for implementing an adaptive image transmission method for improving image quality according to an exemplary embodiment.

First, referring to FIG. 1, an image transmission system 100 may be provided to implement an adaptive image transmission method for improving image quality according to an embodiment. The image transmission system 100 may transmit an image to an image reception system 200. The image may include a still image and/or a moving image.

For example, when the image is a moving image, the image transmission system 100 may adaptively reduce the resolution of the image according to image quality, encode the reduced image, and transmit the encoded image (e.g., encoded information) to the image reception system 200.

The image transmission system 100 may receive an original image to be transmitted to the image reception system 200 from an image storage device 300. The image storage device 300 may be a device for constantly or temporarily storing the original image. For example, the image storage device 300 may include a server or a database for storing images in a large scale, as well as a device for generating an image in real-time and for temporarily storing and transmitting the image, such as a camera or the like. In addition, the image storage device 300 may be a device for transmitting an original image to the image transmission system 100 through a network.

For example, the image transmission system 100 may encode and transmit the original image itself to the image reception system 200 without resizing the original image, or may reduce the original image to a predetermined level, and encode and transmit the reduced image to the image reception system 200, according to the exemplary embodiment.

The image transmission system 100 may determine the image quality of the original image within a range that does not affect the transmission time (e.g., speed) of the image, and determine whether to encode and transmit the original image without resizing the original image, or to reduce the original image and encode the reduced original image, on the basis of the determined image quality.

In this description of exemplary embodiments, the quality of an original image or a reduced image may mean the quality of an image restored by decoding after encoding a corresponding image.

Exemplary embodiments may be effective when the network environment between the image transmission system 100 and the image reception system 200 is a poor network environment having a relatively low bandwidth.

As described above, in the poor network environment, the image quality may be improved when a reduced image, which is reduced from an original image, is encoded and transmitted, and then the reduced image is restored to the original size of the original image and played back at the receiving side. However, exemplary embodiments are not limited to simply determine whether or not to transmit a reduced image according to a network environment such as a network bandwidth or the like. For example, exemplary embodiments may determine the quality of an image, which is actually streamed, and transmit a reduced image according to a result of the determination (e.g., the determined quality of the image). For example, when the image quality is relatively good, the original image may be encoded and transmitted without resizing the original image. For example, when the image quality is relatively poor, it may be more advantageous for service quality (the image quality at the receiving side) to encode and transmit a reduced image with a reduced resolution of the original image, and restore the original size and play back at the receiving side.

A quality determination process for determining the quality of an image may need a process of determining, after restoring the image by decoding after encoding an original image, the quality of the restored image in a predetermined method, e.g., Peak Signal-to-Noise Ratio (PSNR), Structural Similarity Index (SSIM), or the like. For example, when the process of encoding an original image itself and restoring the original image by decoding the encoded image is performed for the quality determination process, considerable time and resources may be consumed, and since it is difficult to determine the image quality in practice due to the considerable time and resources, the conventional method has no choice but to make an indirect determination using a prediction model according to a network environment.

However, according to the exemplary embodiment, in order to determine the quality of an image, it is possible to determine the quality of a reduced image (e.g., an image with reduced spatial resolution) of an original image, not the original image itself, as will be described below in detail. Although the quality determination process is performed on the reduced image, not on the original image itself, it may not need to measure an absolute level of the image quality in order to determine whether to encode and transmit the original image or to encode and transmit the reduced image (e.g., resized image) to the image reception system 200, and it may be sufficient to know a degree of relative image quality.

For example, when the quality of a reduced image is good, the quality of the original image (e.g., an image to be streamed) may be relatively good, and when the quality of a reduced image is poor, the quality of the original image (e.g., an image to be streamed) may be relatively poor. Thus, it may be reasonable to determine a level of the quality of the original image (e.g., an image to be streamed) using the quality of the reduced image.

In addition, since the process of determining the quality of a reduced image may reduce the time and save resources by relatively very large amounts, compared with the image quality determination process of encoding the original image itself, there is an effect (e.g., an advantage) of performing the image quality determination process on all images (e.g., all frames) even in a streaming environment of transmitting an image in real-time.

The reduction level (e.g., the reduction degree) of the original image for performing the image quality determination process may be adaptively selected according to the network delay factor indicating how much the delay is currently according to the network environment between the image transmission system 100 and the image reception system 200. For example, the image transmission system 100 may generate a reduced image for an original image so as not to increase the reduction level as much as possible while the process of determining the quality of the reduced image may be performed within a range of allowing the delay time. This is since that relatively the smaller the degree of reduction is (e.g., the aspect ratio is 1/2, 1/4, 1/8, etc.), i.e., the less the image is reduced, the difference between the quality of the reduced image and the quality of the original image determined through the quality determination process may be relatively small.

The network delay factor may use a network delay time or may be used according to the state of the transmission buffer of the image transmission system 100, e.g., the amounts or frames of images that have not been transmitted, or the like.

As a result, when the network delay factor representing the degree of delay in the current network environment becomes the larger, the amount of time that can be used for the image quality determination process becomes relatively the greater. Thus, in this case, the reduction level may be lowered relatively. On the other hand, when the network delay factor becomes the smaller, the image should be transmitted without additional delay generated by the image quality determination process. Thus, in this case, the reduction level of the reduced image may be increased so that the image quality determination process may be performed within a short time.

As a result, according to the exemplary embodiment, an original image may be reduced by a relatively small reduction level, compared with the quality of the original image (e.g., the image to be streamed), within a range of allowing only the delay occurring in the network. Further, the determination whether to encode and transmit the original image without reducing or resizing the original image or to encode and transmit an image reduced or resized by a predetermined level may be performed by determining the quality of the reduced image.

Here, the quality of a reduced image may include the quality of an image restored by decoding after encoding the reduced image.

The detailed configuration of the image transmission system 100 according to an exemplary embodiment will be described with reference to FIGS. 2 and 3.

Figure 2:
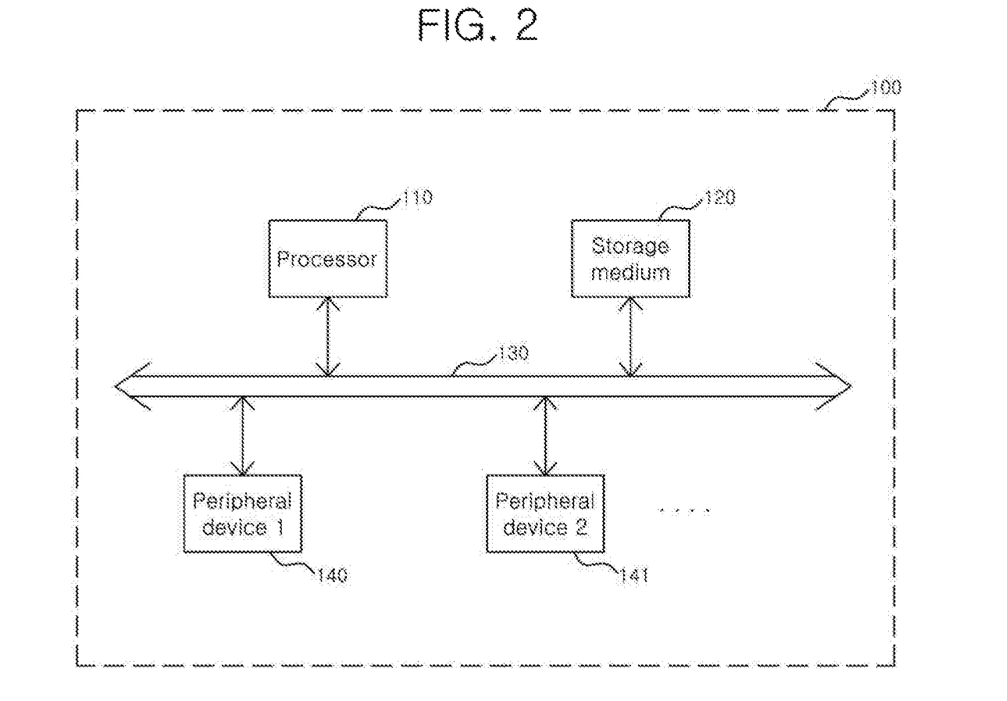
FIGS. 2 and 3 illustrate a schematic configuration of an adaptive image transmission system for improving image quality according to an exemplary embodiment.
Figure 3:
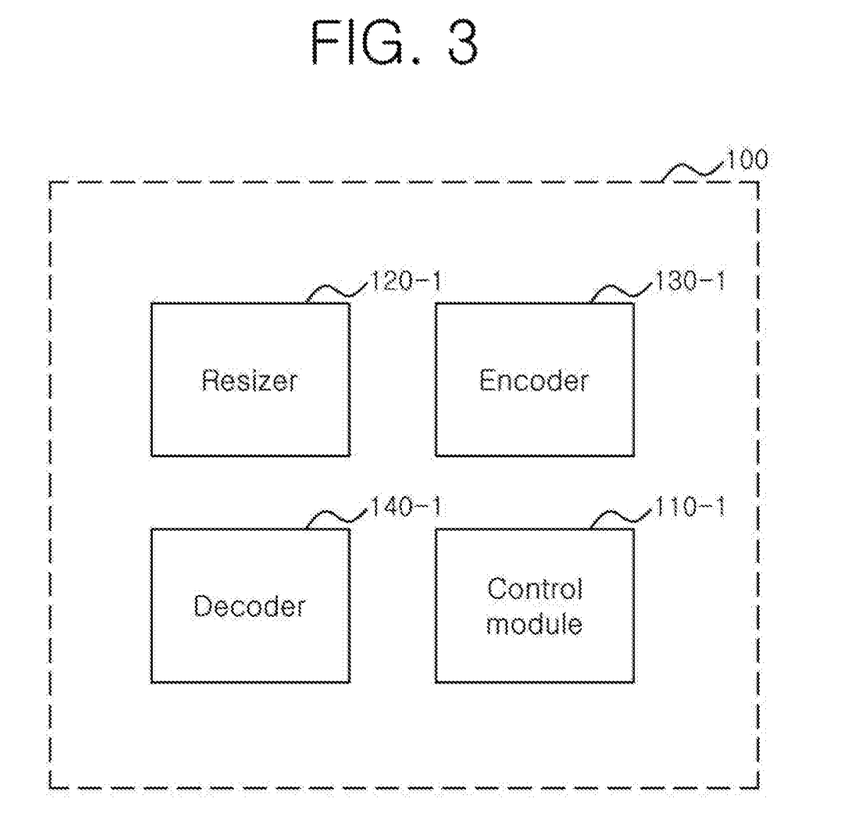

FIGS. 2 and 3 illustrate a schematic configuration of an adaptive image transmission system for improving image quality according to an exemplary embodiment.

First, referring to FIG. 2, the image transmission system 100 may be implemented as a predetermined data processing device.

As shown in FIG. 2, the image transmission system 100 includes a processor 110 and a storage medium 120 for implementing the functions described in this specification. The processor 110 may include a computing device capable of executing a predetermined program (software code) such as an implementation example of the data processing device, a vendor mobile processor, a microprocessor, a CPU, a single processor, a multiprocessor, and the like.

For example, the processor 110 may perform data processing needed for the exemplary embodiment by driving the program.

The storage medium 120 may include a device, in which a program for implementing exemplary embodiments is stored and installed. According to an exemplary embodiment, the storage medium 120 may be divided into a plurality of different physical devices, and according to another exemplary embodiment, a part of the storage medium 120 may be disposed inside the processor 110. The storage medium 120 may be implemented as a hard disk, a solid state disk (SSD), an optical disk, a random access memory (RAM), and/or various other types of storage media according to exemplary embodiments, and the storage medium 120 may be implemented in the image transmission system 100 in a detachable manner as needed.

For example, the image transmission system 100 may be implemented as a server for image streaming, but exemplary embodiments are not limited thereto, and may be implemented as any data processing device (e.g., a computer, a mobile terminal, or the like) having data processing capability for executing the program.

In addition, the image transmission system 100 includes the processor 110, the storage medium 120, various peripheral devices 140 and 141 (e.g., input/output devices, display devices, audio devices, etc.) provided in the image transmission system 100, and a communication interface 130 (e.g., a communication bus, etc.) for connecting these devices.

For example, exemplary embodiments may be implemented by organically combining the program stored in the storage medium 120 and the processor 110, and the functional configuration unit executed by the image transmission system 100 may be as shown in FIG. 3.

For example, the image transmission system 100 may include a control module 110-1, a resizer 120-1, an encoder 130-1, and a decoder 140-1.

In this specification, a module means a functional and structural combination of hardware for performing the functions as described (e.g., the processor 110 and/or the storage medium 120) and software for driving the hardware (e.g., the program for implementing the exemplary embodiments). For example, each of the components may mean a predetermined code and a logical unit of a hardware resource for executing the predetermined code, and it does not necessarily mean a physically connected code, or a type or a specific number of hardware. Accordingly, each of the components means a combination of hardware and software performing the functions defined in this specification, and does not mean a specific physical component.

The control module 210 may control functions and/or resources of other components (e.g., the resizer 120-1, the encoder 130-1, and/or the decoder 140-1) included in the image transmission system 100.

The resizer 120-1 may adjust the size of the original image. For example, a reduced image may be generated by reducing the resolution of the original image at a predetermined magnification. For example, the reduced image may be generated by reducing the horizontal and vertical pixels of the original image at the predetermined magnification.

The encoder 130-1 may encode the reduced image.

The decoder 140-1 may restore an image by decoding the reduced and encoded image.

Then, the control module 110-1 may measure the image quality of the restored image. For example, a publicized image quality measurement algorithm such as the PSNR, the SSIM or the like may be used to measure the image quality, but exemplary embodiments are not limited thereto, and various embodiments for measuring the quality of an image may exist.

For example, the measured image quality of the reduced image (e.g., the quality of the restored image of the reduced image) may be determined by dividing values of PSNR and SSIM into predetermined sections and by determining according to which section the PSNR and SSIM values of the reduced image belong. In addition, the reduction level (e.g., reduction degree) of the original image may be determined in advance when the image is transmitted to the image reception system 200 by the section.

According to an exemplary embodiment, when the PSNR and SSIM values of a reduced image belong to a predetermined first section set to have a relatively good image quality, the control module 110-1 may encode and transmit the original image itself to the image reception system 200 without reducing or resizing the original image.

When the quality of a reduced image belongs to a predetermined second section that is determined to have an image quality degraded more than that of the first section, the control module 110-1 may control the resizer 120-1 to resize the original image to a predetermined first reduction level (e.g., by reducing the horizontal and vertical resolutions of the image by 1/2), encode the resized image through the encoder 130-1, and transmit the encoded image to the image reception system 200.

In addition, when the quality of a reduced image belongs to a predetermined third section that is determined to have an image quality degraded more than that of the second section, the control module 110-1 may control the resizer 120-1 to resize the original image to a predetermined second reduction level (e.g., by reducing the horizontal and vertical resolutions of the image by 1/4), encode the resized image through the encoder 130-1, and transmit the encoded image to the image reception system 200.

In this way, the control module 110-1 may adaptively determine whether or not to resize the original image and/or the reduction level of the original image through the quality of a reduced image when the image is transmitted to the image reception system 200. The section of image quality determination for determining whether or not to resize and/or the reduction level may be determined through repeated experiments (e.g., repeated operations).

For example, the control module 110-1 may confirm a network delay factor between the image transmission system 100 and the image reception system 200. In addition, the reduction level of the reduced image for image quality determination may be determined based on the confirmed network delay factor.

Therefore, it is effective in that the image quality determination process for the reduced image may be performed within a range that does not generate additional delay in the network as much as possible.

The control module 110-1 may calculate a predicted network delay time on the basis of feedback information received from the image reception system 200, and may utilize the network delay time as the network delay factor.

The feedback information is sufficient as long as it is information capable of confirming the delay time of the network, such as an image reception rate of the image reception system 200, an image reception time of a specific packet, or the like.

According to another embodiment, the control module 110-1 may confirm the state of the transmission buffer of the image transmission system 100 (e.g., the amounts or frames of images that have not been transmitted, or the like) as the network delay factor.

For example, the control module 110-1 classifies the degree of the network delay factor by the class according to a predetermined criterion, and when the current degree of the network delay factor is classified as high, i.e., when the network delay is relatively high, the reduction level of the reduced image may be determined to be low. For example, the resizer 120-1 is controlled to perform a relatively small reduction so that there is no big difference between the image quality determined through the image quality determination process and the quality of the original image.

Contrarily, when the current degree of the network delay factor is classified as low, i.e., when the network delay is relatively low, the reduction level of the reduced image may be determined to be high. For example, as the resizer 120-1 is controlled to perform a relatively large reduction, although there is a big difference between the image quality determined through the image quality determination process and the quality of the original image, the time of the image quality determination process may be reduced.

The reduction level to be applied to the network delay factor may also be determined through repeated experiments, e.g., repeated operations.

Figure 4:
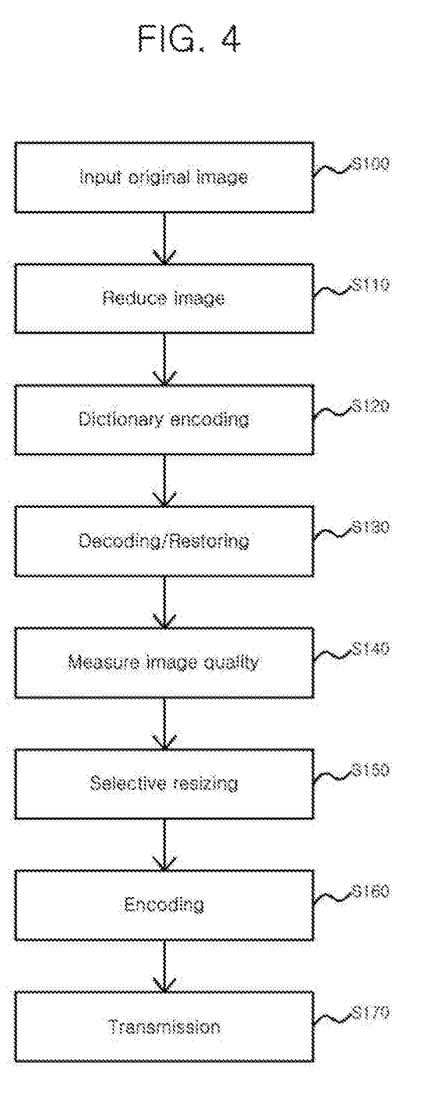
FIG. 4 is a flowchart illustrating an adaptive image transmission method for improving image quality according to an exemplary embodiment.
Figure 5:
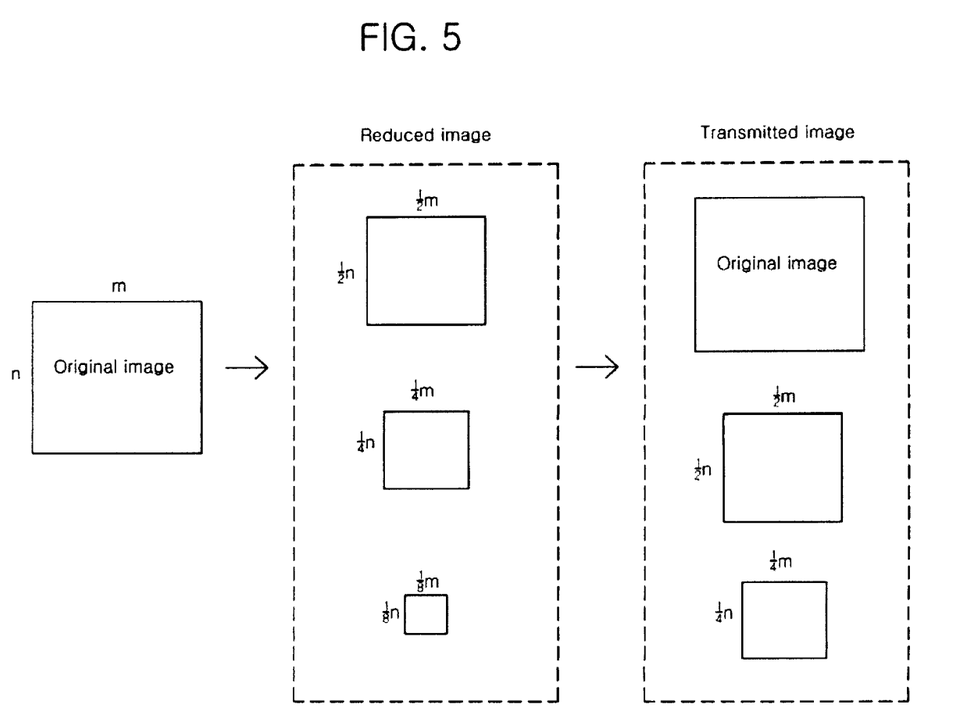
FIG. 5 is a view for explaining an example of a reduced image and a transmitted image according to an adaptive image transmission method for improving image quality according to an exemplary embodiment.

The adaptive image transmission method for improving image quality according to the exemplary embodiments may be summarized in time series as shown in FIG. 4. In addition, FIG. 5 is a view for explaining an example of a reduced image and a transmitted image according to an adaptive image transmission method for improving image quality according to an exemplary embodiment.

FIG. 4 is a flowchart illustrating an adaptive image transmission method for improving image quality according to an exemplary embodiment.

Referring to FIG. 4, the image transmission system 100 may receive an original image from the image storage device 300 (S300). Further, according to an exemplary embodiment, the image storage device 300 may be implemented to be included in the image transmission system 100.

Then, the image transmission system 100 may generate a reduced image to determine the quality of the original image (e.g., the quality of an image restored by decoding after encoding the original image) (S110).

For example, the reduction level of the reduced image to be generated may be adaptively selected on the basis of the network delay factor as described above.

For example, according to a degree of the network delay factor, the aspect ratio of the original image may be reduced to any one of predetermined ratios such as 1/2, 1/4, or 1/8 as shown in FIG. 5.

Then, the image transmission system 100 may restore the reduced image by decoding after pre-encoding the reduced image (S120, S130).

Then, for the restored image, the image transmission system 100 may determine an image quality and derive a result of the image quality determination (S140).

Then, resizing of the original image may be selectively performed according to the result of the image quality determination, and when the resizing of the original image is performed, a reduction level of the resizing of the original image may be adaptively determined based on the result of the image quality determination (S150).

For example, as shown in FIG. 5, the image transmission system 100 may encode an original image itself and transmit the encoded image to the image reception system 200 without performing resizing according to the result of the image quality determination. For example, the image transmission system 100 may perform resizing of the original image by reducing the aspect ratio of the original image at a predetermined ratio, e.g., any one of predetermined ratios such as 1/2, 1/4, and the like.

Then, the image transmission system 100 may encode the selectively resized image and transmit the encoded image to the image reception system 200 (S170).

When resizing of the original image is performed, the image transmission system 100 may transmit information on the resizing ratio to the image reception system 200, and the image reception system 200 may restore and play an image having the image size of the original image on the basis of the received resizing ratio.

The resizer 120-1 of the image reception system 200 may utilize a resizing algorithm such as bilinear, bicubic, lanczos or the like to reduce the original image. In addition, the resizer 120-1 may use bilinear, bicubic, lanczos, or a deep learning-based super resolution algorithm to enlarge an image to the original image size. However, the algorithm for scale-down (reduction) or scale-up (enlargement) of an image is not limited thereto, and various methods may be used.

The adaptive image transmission method for improving image quality according to an exemplary embodiment may be implemented as a computer-readable code in a computer-readable recording medium. The computer-readable recording medium includes all kinds of recording devices in which data that can be read by a computer system is stored. Examples of the computer-readable recording medium are ROM, RAM, CD-ROM, a magnetic tape, a hard disk, a floppy disk, an optical data storage device, and the like. In addition, the computer-readable recording medium may be distributed in computer systems connected through a network, and a code that can be read by a computer in a distributed manner may be stored and executed therein. In addition, functional programs, codes and code segments for implementing the present invention may be easily inferred by the programmers in the art.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An adaptive image transmission method for improving image quality, the method comprising the steps of:
   generating a reduced image by reducing an image for measuring a quality of an original image to be transmitted, by an image transmission system;
   measuring a restored image quality of the reduced image restored by decoding after performing pre-encoding on the reduced image, by the image transmission system;
   selectively resizing the original image based on the restored image quality, by the image transmission system; and
   encoding the selectively resized original image and transmitting the encoded image to an image reception system, by the image transmission system,
   wherein the step of selectively resizing the original image based on the restored image quality includes the step of classifying a degree of the image quality according to a predetermined criterion, and resizing, when the image quality is classified as low, to reduce the original image much more compared with when the image quality is classified as high, by the image transmission system.

2. The method of claim 1, further comprising the steps of:
   confirming a network delay factor, by the image transmission system; and
   determining a reduction level of the reduced image based on the confirmed network delay factor.

3. The method of claim 2, wherein the step of confirming a network delay factor by the image transmission system includes the step of:
   confirming a predicted network delay time as the network delay factor based on feedback information received from the image reception system, by the image transmission system; or
   confirming a state of a transmission buffer of the image transmission system as the network delay factor.

4. The method of claim 2, wherein the step of determining a reduction level of the reduced image based on the confirmed network delay factor includes the step of classifying a degree of the network delay factor according to a predetermined criterion, and determining, when the degree of the network delay factor is classified as high, the reduction level to be low compared with when the degree of the network delay factor is classified as low, by the image transmission system.

5. A non-transitory computer-readable medium having stored thereon computer-executable instructions configured to cause a processor to perform operations for performing the method of claim 1.

6. An adaptive image transmission system comprising:
   a processor; and
   a non-transitory computer-readable medium having stored thereon computer-executable instruction configured to cause the processor to perform operations, wherein
   the processor is configured to:
      generate a reduced image by reducing an image to measure a quality of an original image to be transmitted,
      measure a restored image quality of the reduced image restored by performing decoding after performing pre-encoding on the reduced image,
      determine an output resolution of the original image based on the restored image quality,
      selectively resize the original image based on the determined output resolution, and
      encode the selectively resized original image and transmitting the encoded image to an image reception system,
   wherein the reduced image is generated by reducing a size of the image for measuring the quality of the original image to be transmitted to a predetermined ratio.

7. The system of claim 6, wherein the processor is configured to confirm a network delay factor, and determine a reduction level of the reduced image based on the confirmed network delay factor.

8. The method of claim 1, wherein the reduced image is generated by reducing a size of the image for measuring the quality of the original image to be transmitted to a predetermined ratio.

9. The system of claim 1, wherein the reduced image is generated by reducing a resolution of the image for measuring the quality of the original image to be transmitted to a predetermined ratio.

10. The system of claim 6, wherein the reduced image is generated by reducing a resolution of the image for measuring the quality of the original image to be transmitted to a predetermined ratio.

11. An adaptive image transmission method for improving image quality, the method comprising the steps of:
    generating a reduced image by reducing an image for measuring a quality of an original image to be transmitted, by an image transmission system;
    measuring a restored image quality of the reduced image restored by decoding after performing pre-encoding on the reduced image, by the image transmission system;
    selectively resizing the original image based on the restored image quality, by the image transmission system; and
    encoding the selectively resized original image and transmitting the encoded image to an image reception system, by the image transmission system,
    wherein the reduced image is generated by reducing a size of the image for measuring the quality of the original image to be transmitted to a predetermined ratio.

* * * * *